United States Patent [19]

Hutta

[11] Patent Number: 4,666,486
[45] Date of Patent: May 19, 1987

[54] PROCESS FOR MAKING BULK HEAVY METAL FLUORIDE GLASSES

[76] Inventor: Joseph J. Hutta, P.O. Box 907, Main St., Groton, Mass. 01450

[21] Appl. No.: 779,401

[22] Filed: Sep. 24, 1985

[51] Int. Cl.$^4$ .......................................... C03B 37/027
[52] U.S. Cl. .......................................... 65/3.11; 65/13; 65/17; 65/136; 65/DIG. 16; 423/72; 423/76; 423/492; 501/30
[58] Field of Search .................. 65/3.11, 17, DIG. 16, 65/134, 136, 13; 423/72, 76, 492; 501/30

[56] References Cited

U.S. PATENT DOCUMENTS

| | | | |
|---|---|---|---|
| 2,466,506 | 4/1949 | Sun et al. | 106/47 |
| 2,466,507 | 4/1949 | Sun | 106/47 |
| 2,466,509 | 4/1949 | Sun | 106/47 |
| 2,511,224 | 6/1950 | Sun et al. | 106/47 |
| 3,709,827 | 1/1973 | Auzel | 252/301.4 R |
| 3,937,625 | 2/1976 | Stewart | 65/136 |
| 4,141,741 | 2/1979 | Lucas et al. | 106/47 Q |
| 4,308,066 | 12/1981 | Mitachi et al. | 501/37 |
| 4,346,176 | 8/1982 | Kanamori et al. | 501/37 |
| 4,388,097 | 6/1983 | Turk et al. | 65/64 |
| 4,578,252 | 3/1986 | Pastor | 423/76 |

FOREIGN PATENT DOCUMENTS 1587156 4/1981 United Kingdom .
1587157 4/1981 United Kingdom .

OTHER PUBLICATIONS

"Techniques for the Preparation of Bulk High Optical Quality Heavy Metal Fluoride Glasses" Hutta et al, Solid State Sciences Division, Rome Air Development Center Hanscom AFB, MA 01731, #484–12, 6 pages Released 10/1984.
Mateika, D., "Substrates for Epitaxial Garnet Layers: Crystal Growth and Quality," *Current Topics in Materials Science*, vol. 11, ed. by Kaldis, 1984, pp. 164–165.
Bendow, B., et al, "Material Dispersion of Fluorozirconate-Type Glasses," *Applied Optics*, vol. 20, No. 21, Nov. 81, pp. 89 to 91.
Drexhage, M. G. et al, "Heavy-Metal Fluoride Glasses for Mid-IR Military Applications," *Aerospace America*, Apr. 1985, pp. 66–69.
Drexhage, M. G. et al., "Heavy Metal Fluoride Glasses: A Compendium of Publications from RADC," May 1981, pp. 99–112 and 135.

*Primary Examiner*—Robert L. Lindsay, Jr.
*Attorney, Agent, or Firm*—Stanton E. Collier; Donald J. Singer

[57] ABSTRACT

Heavy metal fluoride glasses are made by a process that requires high purity fluoride constituent compounds, some of which are further refined by sublimation. Handling occurs in a protective atmosphere such as argon. The charge is placed in a sealed modified optical growth furnace having the ability of atmosphere control, heat control and position control of the charge. The charge is firstly raised to its fusion temperature, then to an admixture temperature, and finally to a higher temperature. The charge is immediately removed from the heating source and quickly cooled through the critical crystallization region. The total heating and cooling time being about one to two hours. The resulting glass ingot is partially annealed. The HMFG of (Zr or Hf)$F_4$-Ba$F_2$-La$F_3$-Al$F_2$ consistently exhibits low levels of both light scattering and bulk OH contact, along with very reproducible hardness, thermal parameters, and UV and IR edge absorption behavior.

5 Claims, 9 Drawing Figures

PROCESS FOR MAKING BULK HEAVY METAL FLUORIDE GLASSES

STATEMENT OF GOVERNMENT INTEREST

The invention described herein may be manufactured and used by or for the Government for governmental purposes without the payment of any royalty thereon.

BACKGROUND OF THE INVENTION

This invention relates to the preparation of glasses, and, in particular, relates to the preparation of heavy metal fluoride glasses with reproducible high optical qualities.

Considerable effort has been expended to develop heavy metal fluoride glasses ("HMFG") as a viable family of infrared-transparent optical materials for application as fiber waveguides and as bulk optical components. The specific characteristics of these materials and their advantages in terms of optical performance over silica and other oxide-based glasses are well known.

Because of fundamental physio-chemical differences, the HMFG are not as easily formed into bulk components (e.g., plates, discs, rods) as are many multi-component glasses. For example, the viscosity (0.1–1.0 poise) of most heavy metal fluoride melts near the liquidus (800°–1000° C.) is similar to that of water. This high fluidity, coupled with the proximity of the glass-transition ($T_g \sim 320°$ C.) and crystallization temperatures ($T_x \sim 400°$ C.) in many HMFG compositions, translates into an oftentimes marked tendency for melts to devitrify or crystallize upon cooling. In addition, the presence of specific impurities such as hydroxyl species and trace oxides may be instrumental in the nucleation and growth of crystallites.

These problems are often exacerbated by the melting techniques traditionally utilized to prepare HMFG which involve the use of oxide starting materials converted in situ to fluorides via heating with ammonium bifluoride. While the conventional method represents a simple and straightforward approach to glass preparation, it has encountered difficulties in reproducing physical and optical properties from batch to batch. Moreover, such "conventionally" prepared samples often contain inclusions, crystallites and/or flow striae, the latter formed during casting of the melt.

SUMMARY OF THE INVENTION

The present invention sets forth a process of forming heavy metal fluoride glasses that overcomes the problems noted hereinabove.

The present process is directed to the heavy metal fluoride glass of the composition, in particular:

$$XF_4 + BaF_2 + LaF_3 + AlF_3 \qquad (1)$$

Where X is either zirconium or hafnium.

Anhydrous fluorides of reasonably high purity are commercially obtained for $BaF_2$, $LaF_3$ and $AlF_3$, for example. Zirconium dioxide powder was converted to a fluoride by heating it in the presence of ammonium bifluoride. Hafnium tetrafluoride was obtained commercially. Both zirconium and hafnium tetrafluoride were refined by sublimation. After weighing and thorough mixing in an argon-filled glove box, the powdered glass mixture or isostatically pressed dense pellets of same are placed in a vitreous carbon or noble metal crucible. The crucible with the charge was then placed in a sealed crystal growth furnace. The furnace is evacuated and backfilled with argon. The argon is passed through a flask containing carbon tetrachloride to create a reactive atmosphere over the glass melt for removal of hydroxyl and oxide species. The resulting melt was quickly cooled by disengagement from the heat source and removed. The resulting clear glass ingot is then annealed for about three hours at 280° C. and then slowly cooled.

The heating sequence is as follows: (1) heating the mixture to a level in excess of its fusion temperature, 544° C., and allowing interaction with a reactive atmosphere of dry argon-transported carbon tetrachloride ($CCl_4$); (2) raising the temperature to around 800° C. to promote complete admixture of the molten components; and (3) raising the temperature to around 900° C., and holding it at that point for a short period before turning off the furnace power resulting in the abrupt removal of the heat source, and withdrawing the crucible support a short distance. This allows the glass to form, in situ, and permits partial annealing.

It is therefore one object of the present invention to provide a process of making bulk heavy metal fluoride glasses (HMFG).

It is another object of the present invention to provide a process of making HMFG of high optical quality, in bulk.

It is another object of the present invention to provide a process of making HMFGs having highly reproducible optical and physical characteristics.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

The present invention is a process of providing stable, highly reproducible, high optical quality heavy metal fluoride glasses that lack devitrification, striae, seed, internal bubbles, crystalline inclusions or other defects and inhomogeneities common in glasses of this type.

Figure 1:
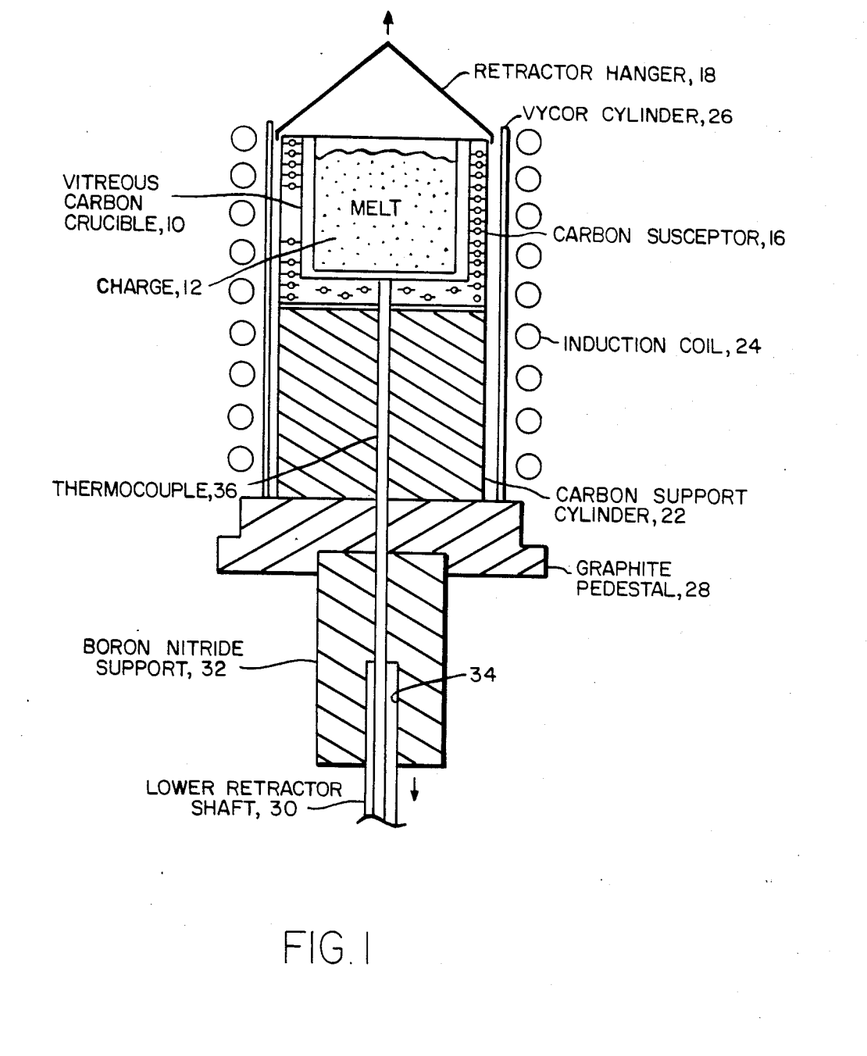
FIG. 1 is a partial schematic of an RF-heated induction furnace of the present invention.

Referring to FIG. 1, pressed dense pellets or loose powders and fragments of the heavy metal fluoride glass (HMFG) composition are placed in a crucible 10 to form a charge 12. Crucible 10 is placed in a susceptor 16 that is shaped like a cup and made of carbon, for example. Susceptor 16 is connected by means of hanger 18 to a vertically movable means, not shown. Susceptor 16 rests upon a support cylinder 22. Susceptor 16 is protected from heating induction coil 24 by a fused silica cylinder 26. It is also possible to use crucible 10 itself as the susceptor with hanger 18 attached thereto. Cylinder 26 and support cylinder 22 rest upon a graphite pedestal 28. A lower retractor shaft 30 is connected to a support 32 that holds pedestal 28. A hole 34 through shaft 30, support 32, pedestal 28, and cylinder 22 allows a thermocouple 36 therein to be is in close contact with crucible 10. The above items are placed within a sealed crystal growth furnace (Model MP, Arthur D. Little Co.) being conventional except for the means of lowering shaft 30 and raising hanger 18.

The important features of the above apparatus are the ability to quickly remove crucible 10 from the source of heat such as coil 24, being able to immediately cool melt charge 12 by instantaneous termination of electric power to induction coil 24, and being able to adjust the separation between crucible 10 and support cylinder 22 that acts like a heat source after heating induction coil 24 is turned off. Induction coil 24 is made of copper tubing and kept from melting by a constant flow of chilled 40° F. water. This flow continues after power shutoff but is not *necessary* to the glass formation process.

The glasses were of composition (mol %) 57XF$_4$-36BaF$_2$-3LaF$_3$-4AlF$_3$, where X=either Zr or Hf; the former are denoted by the acronym "ZBLA", while the latter are referred to as "HBLA". While the process described is applicable to a variety of HMFG compositions, these particular glasses were chosen because they have been extensively characterized and are relatively stable.

These compositions are only one of a number of compositions in the glass-forming region of the zirconium/-hafnium-barium-lanthanum-aluminum fluoride systems. Moreover, aluminum represents an additive to the Zr/Hf-Ba-La systems, in which it is possible to form glass without its presence.

This process is not limited to the ZBLA/HBLA fluoride compositions given above, but can be applied to all other fluoride glasses, and even chloride glasses, with only slight modification of procedure. A list of these fluoride glasses is shown in Table 1 but this is still not all-inclusive.

In making up a batch composition from the components either the anhydrous fluorides or the oxides, or mixtures of the two can be used. Where oxides are present the mixture must be given a fluorination treatment. This can be done by introducing an atmosphere of fluorine-containing vapor. This can be HF gas or addition of ammonium bifluoride (NH$_4$HF$_2$). The latter is preferred. The need for fluorination can be obviated by using the anhydrous fluorides as starting material. This is the preferred approach although the use of oxides or mixed oxides/fluorides is less expensive and may be preferred for production runs.

Commercially available anhydrous fluorides are used as starting materials: BaF$_2$ ("Optipur" grade, EM Laboratories), LaF$_3$ (99.9%, Alfa-Ventron), AlF$_3$ ("Optical" Grade, 99.5%, Cerac). These materials are generally free of oxide impurities, although they may contain relatively high levels of transition metals or rare earths. The as-received chemicals are opened and handled only in an inert gas-filled glove box. Exposure of the chemicals to the ambient atmosphere is minimized in order to reduce possible contamination.

TABLE 1

| Composition | Approximate mol, |
|---|---|
| HZBT | 29-29-33-9 |
| HBT | 58-33-9 |
| HBL | 60-35-5 |
| HBLC | 62-23-5-10 |
| HBLR | 56-22-7-15 |
| HBLP | 62-15-5-18 |
| HBPC | 62-15-15-8 |
| HBLAPC | 62-15-5-2-10-6 |
| HBTKLRC | 53-22-8-4.2-4.2-4.2-4.2 |
| HBTLNRC | 53-22-8-4.2-4.2-4.2-4.2 |
| HBLA | 57-36-3-4 |
| ZBT | 58-33-9 |
| ZBL | 62-33-5 |
| ZBTKLRC | 53-22-8-4.2-4.2-4.2-4.2 |
| ZBLA | 57-36-3-4 |
| ZBLC | 60-23-7-10 |
| ZBLAN | 56-14-6-4-20 |
| BZnYT | 17.5-30-26.5-26 |
| BZnYAT | 15-27-27-4-27 |
| BZnYAT | 20-29-14.4-14.4-22.2 |
| BYAT | 20-29-29-22 |
| BZnYT | 20-26.7-26.7-26.7 |
| BZnLTG | 19-25-25-25-6 |
| BZnYTN | 14-27-27-27-5 |

H — Hafnium
Z — Zirconium
B — Barium
T — Thorium
L — Lanthanium
C — Cesium
R — Rubidium
Zn — Zinc
P — Lead
A — Aluminum
N — Sodium
Y — Ytterbium
K — Potassium
G — Gadolinium Zirconium and hafnium tetrafluoride, which constitute approximately 60% of glass composition, are not generally available in high purity forms. These compounds were refined via sublimation, as both exhibit vapor pressures of about one atmosphere near 900°–1000° C.

In the case of ZrF$_4$, zirconium dioxide powder (99+%, Alfa-Ventron) was first heated in the presence of ammonium bifluoride to convert the oxide to a fluoride. Hafnium tetrafluoride of 99.5% purity was obtained commercially (Apache Chemical Co.). The sublimation apparatus consisted of two vitreous carbon crucibles placed mouth to mouth, with the lower crucible containing—200 gm of ZrF$_4$ or HfF$_4$. The assembly was contained in a fused quartz cylinder through which argon was passed; RF induction heating was employed with the hot zone centered on the lower crucible. During a typical sublimation (7 hours at 850°–875° C.), an easily removed deposit of water-white dendritic crystals forms in the upper crucible; yields averaged—80 gm. The residue in the lower crucible was gray or black in color, indicating considerable impurities in the as-received material.

After weighing and mixing in the glove box, the powdered glass batches were isostatically pressed into dense pellets and loaded into a 35 mm diameter by 35 mm high vitreous carbon crucible 10. Pellets were pressed *only* for convenience in handling and to get the maximum weight of glass batch mixture in crucible 10. Crucible 10 was then placed into a sealed crystal growth furnace (model MP, Arthur D. Little Co.) which consists of a water cooled, stainless steel vessel with multiple view and access ports, and associated vacuum system. The furnace may be operated under vacuum or pressure and can accommodate almost any type of inert or reactive atmosphere.

In practice, the furnace is first evacuated and then backfilled with argon. The argon is then diverted through a flask, not shown, containing carbon tetrachloride liquid to create a reactive atmosphere over the glass melt charge 12 for removal of hydroxyl and oxide species. The argon gas is passed over the liquid.

Figure 2:
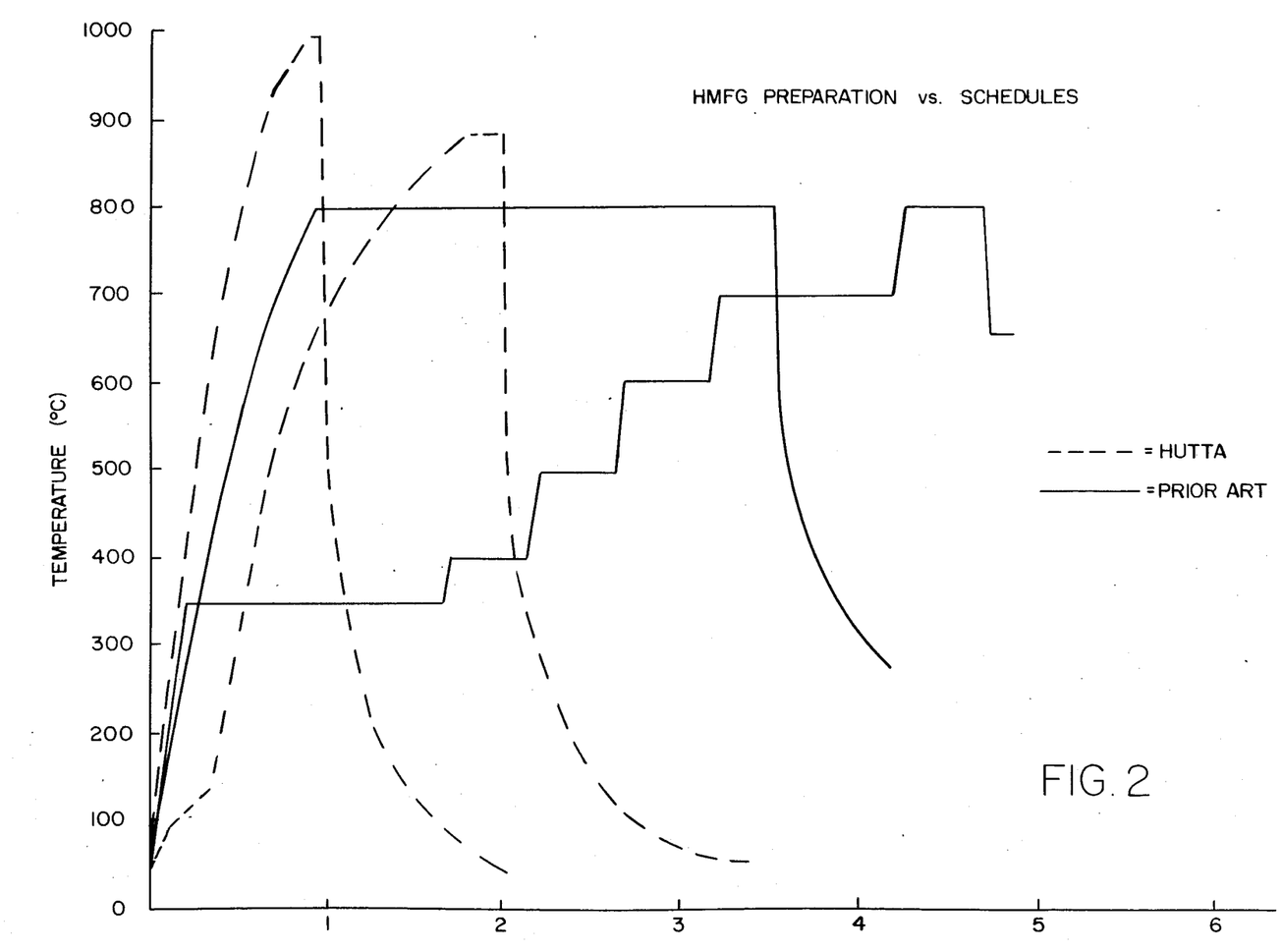
FIG. 2 is a graph comparing previous process to process of the present invention.

As to the heating schedule used in the present invention, refer to FIG. 2. The dashed lines indicate inventive schedules versus the solid lines which illustrate previous techniques. The process of the present invention has been carried out in a time period as short as one hour whereas previous techniques required five hours or longer.

Figure 9:
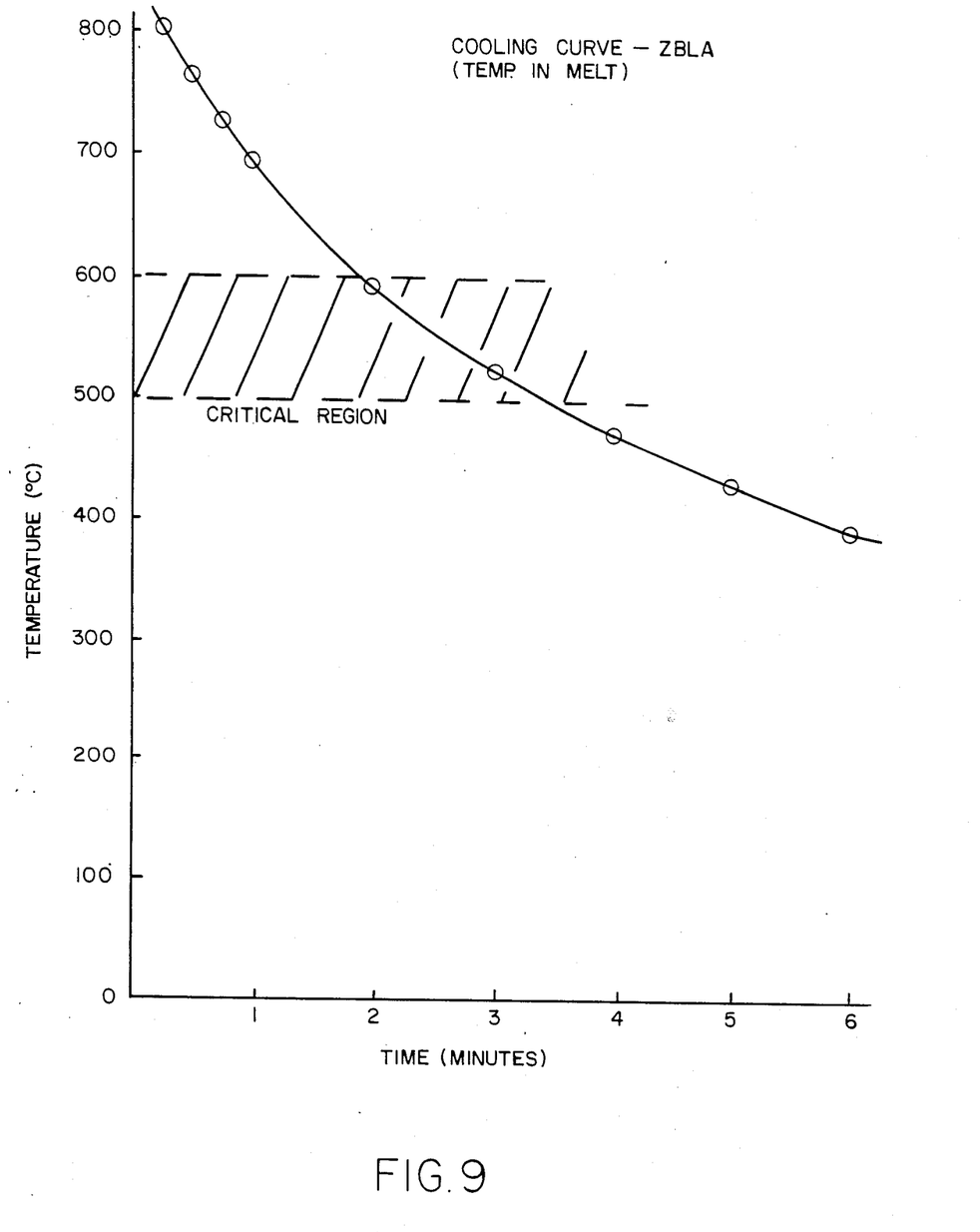
FIG. 9 is a cooling curve of ZBLA of the present invention.

The heating sequence consists of (1) heating the mixture to a level in excess of its fusion temperature, i.e., 544° C., and allowing interaction with a reactive atmosphere of dry argon transported carbon tetrachloride ($CCl_4$). Other atmospheres such as nitrogen, $PF_5$, $PCl_5$, and $SF_6$ are also possible; (2) raising the temperature to around, i.e., 800° C. to promote complete admixture of the molten components; and (3) raising the temperature to about 900° C., and holding it at that point for a short period before turning off furnace power, and withdrawing the crucible support cylinder 22 a short distance and/or raising the crucible 10. This allows the glass to form, in situ, and permits partial annealing. A cooling rate as high as possible is desirable. In the present embodiment, cooling rates of around 65° C. per minute on cooling through the 600° to 500° C. temperature region are effective in producing high quality glass. See FIG. 9, for example. Rates as high as 81° C. per minute and as low as 61° C. per minute have produced high quality glass. In practice, the 600° to 500° C. temperature region appears to be critical with regard to the onset of crystallization and it must be traversed as quickly as possible as an additional factor in producing high optical quality HMFG glass. The above applies, in particular, to ZBLA, HBLA and ZBLAN. The cooling rates and critical temperatures may be somewhat different for other HMFG compositions. The resulting clear glass ingot is removed from the crucible; the ingot is subsequently annealed for three hours at 280° C. near the glass transition point, Tg, and then cooled to room temperature at a rate of 0.3° C./min.

The 14 Z/HBLA glass specimens prepared were 3.5 cm in diameter with thicknesses up to 2.0 cm before grinding and polishing. Bubbles at the melt/crucible interface were confined to the surface of the samples and do not extend to the interior. All specimens were water-white, striation free, and appear to have an excellent optical homogeneity.

To ascertain the homogeneity and reproducibility of the 14 samples (12 ZBLA and 2 HBLA) prepared by the RF melting, a variety of optical and physical properties measurements were made. Reference is made to Table 2 and FIGS. 3 to 8. These included: UV and IR edge spectroscopy, differential scanning calorimetry to determine glass transition and crystallization temperatures, hardness, refractive index, light scattering, and an examination of OH band intensities in the specimens.

Table 2 lists some of the characteristics of the 12 ZBLA glasses prepared for this study. The designation "SI" indicates specimens fabricated in the induction-heated furnace; they are listed in chronological order of preparation. Thicknesses after grinding and polishing to a spectroscopic grade finish ranged from 0.25 to 1.6 cm. Samples SI-1 through SI-5 had a common origin in a large batch which worked successfully in run SI-1 but which devitrified during run SI-2. A partially crystalline cullet from the latter was subsequently utilized in the preparation of samples SI-3, 4, 5.

TABLE 2

| | | | 57ZrF$_4$—36BaF$_2$—3LaF$_3$—4AlF$_3$(ZBLA) GLASS | | | |
|---|---|---|---|---|---|---|
| CODE | x (cm) | Tg (°C.) | Tx (°C.) | HARD. (Kg/mm$^2$) | INDEX ($n_D$) | (at 488 nm) SCATT. LOSS (db/km) | REMARKS |
| SI-1 | 0.252 | 303 | 394 | 258 | 1.538 | 6.15 | BATCHED FLUORIDES |
| SI-3 | 0.434 | — | — | 256 | 1.509 | 2.56 | ⎫ |
| | | | | | | | ⎬ REMELTS OF |
| SI-4 | 0.482 | — | — | 246 | 1.542 | 2.42 | ⎭ RF-PREPARED CULLET |
| SI-5 | 1.012 | 312 | 390 | 249 | 1.531 | 6.30 | |
| SI-7 | 1.548 | — | — | 261 | 1.544 | 5.44 | |
| SI-8 | 1.603 | 317 | 393 | 258 | 1.548 | — | |
| SI-10 | 1.084 | — | — | 238 | 1.528 | 9.50 | |
| SI-11 | 1.045 | 314 | 391 | 260 | 1.535 | 3.06 | |
| SI-12 | 1.054 | — | — | 258 | 1.540 | 4.33 | |
| SI-13 | 1.054 | 315 | 395 | 254 | 1.539 | 4.66 | |
| SI-14 | 1.017 | — | — | 259 | 1.531 | 3.03 | |
| SI-15 | 1.088 | 314 | 392 | 257 | 1.533 | 5.84 | LOW GRADE BaF$_2$ |
| CH-4 | 0.24 | 309 | 387 | 257 | 1.541 | 13.09 | RF REMELT OF 550 |
| 550 | 0.32 | 311 | 393 | 253 | 1.528 | 6.98 | ⎫ |
| | | | | | | | ⎬ OPEN POT MELT |
| 1019 | 0.309 | 316 | 392 | 250 | 1.527 | 980.4 | ⎭ |
| SIO$_2$ | — | — | — | 635 | 1.458 | 11.6 | |

In sample SI-15, a lower purity barium fluoride (99%, Alfa-Ventron) was utilized, this resulted in a specimen which exhibited a yellowish color. Table 2 also shows data for two samples (550 and 1019) prepared via the "conventional" melting methods, i.e., in vitreous carbon crucibles in a resistance heated pot furnace lined with fused silica and flushed with an argon/$CCl_4$ mixture. See FIG. 2 as to the heating schedule.

These glasses were cast into molds, as it was not possible to vitrify them in situ. Sample CH-4 was also prepared by the "conventional" method; the resulting glass was then remelted in the induction furnace in an unsuccessful effort to enhance its quality.

Table 2 indicates the glass transition and crystallization temperatures of the majority of the specimens to be identical within experimental error after the operational parameters of the induction furnace method were established (i.e., from glass SI-5 onwards). Vickers microhardness data also shows good uniformity from batch to batch. The refractive index data of Table 2 exhibits some variability. This is due in part to experimental errors in the minimum deviation measurement method through corners of the specimens which involved one rough surface. It is also possible that the amount of chlorine incorporated into the samples varied with the size of the batch. Nascent chlorine is the active by-product of the decomposition of the $CCl_4$ atmosphere utilized in melting; it readily enters the melt and increases the refractive index of the glass. Volatilization of $ZrF_4$, though not a major problem during the short time melting schedules employed here, can also lead to index variations.

Of particular interest in Table 2 are the exceptionally low levels of Rayleigh scattering observed in the induction furnace prepared samples at a wavelength of 0.4880 microns. It is sufficient to point out here that the values obtained are relatively uniform over a large number of samples and their magnitude is roughly ½ to ⅔ that of fused silica at the same wavelength. By contrast, light scattering levels in conventionally prepared samples are generally higher and difficult to reproduce or control (e.g., CH-4, 550, 1019).

Figure 3:
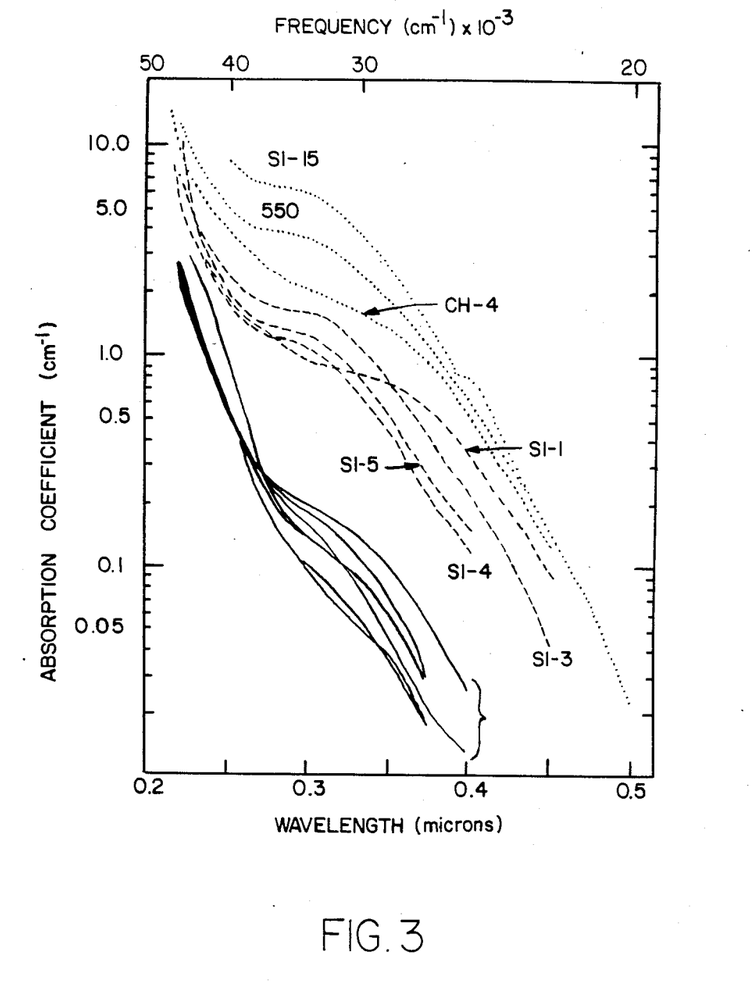
FIG. 3 is a graph of absorption coefficient versus wavelength of the HMFG samples made by the present invention.

A composite plot of the UV absorption edges determined for the specimens in Table 2 is presented in FIG. 3. The edges appear to fall into three general groups, denoted by the solid, dashed and dotted lines. Samples SI-7 through SI-14 exhibit excellent reproducibility and comparatively low absorption coefficients. The glass with the pronounced yellowish cast (SI-15) had the highest UV absorption, most likely due to transition metal contamination from the lesser purity barium fluoride used in its preparation. Data for the earliest samples (SI-1 to SI-5), which have a common origin in a single batch of raw materials, also exhibits reproducibility, although at somewhat higher levels of the absorption coefficient. In samples prepared by conventional means, the UV edge is difficult to control. FIG. 3 indicates the comparatively high values obtained in Sample No. 550; data for Sample No. 1019, which is not shown, fell between the solid and dashed groups of curves. Merely remelting a conventionally-prepared glass in the sealed furnace (e.g., CH-4) does not appear to enhance its UV behavior.

In view of the applications envisioned for HMFG, their optical behavior in the 1-8 micron region of the spectrum is of particular significance. Previous experience with ZBLA-type compositions prepared by different melting methods had indicated considerable variation in sample quality, size, and mid-infrared optical properties such as OH and oxide band intensities. Specimens prepared by the induction-furnace method appear to have circumvented many of these problems and show a high degree of uniformity in their mid-IR optical characteristics.

Figure 4:
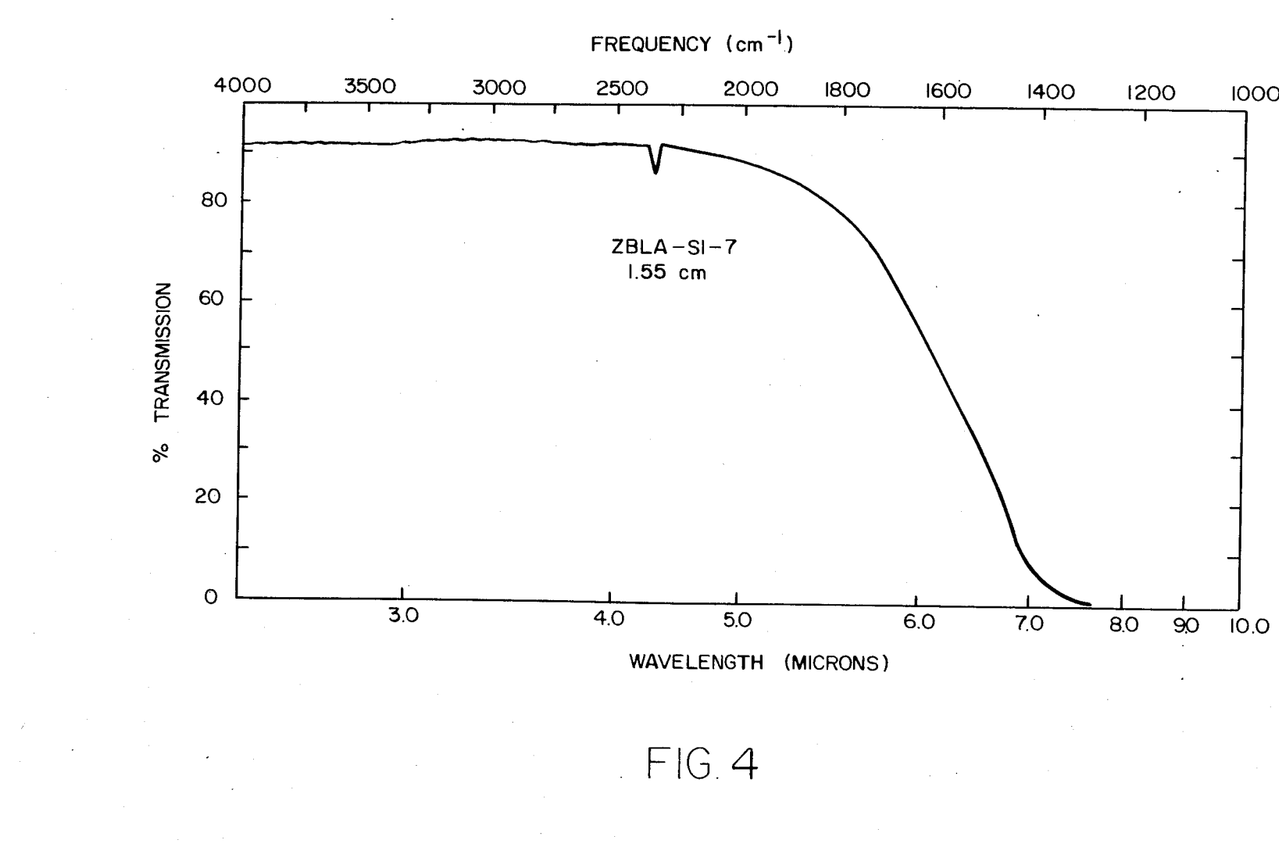
FIG. 4 is a graph of percent transmission versus wavelength.
Figure 5:
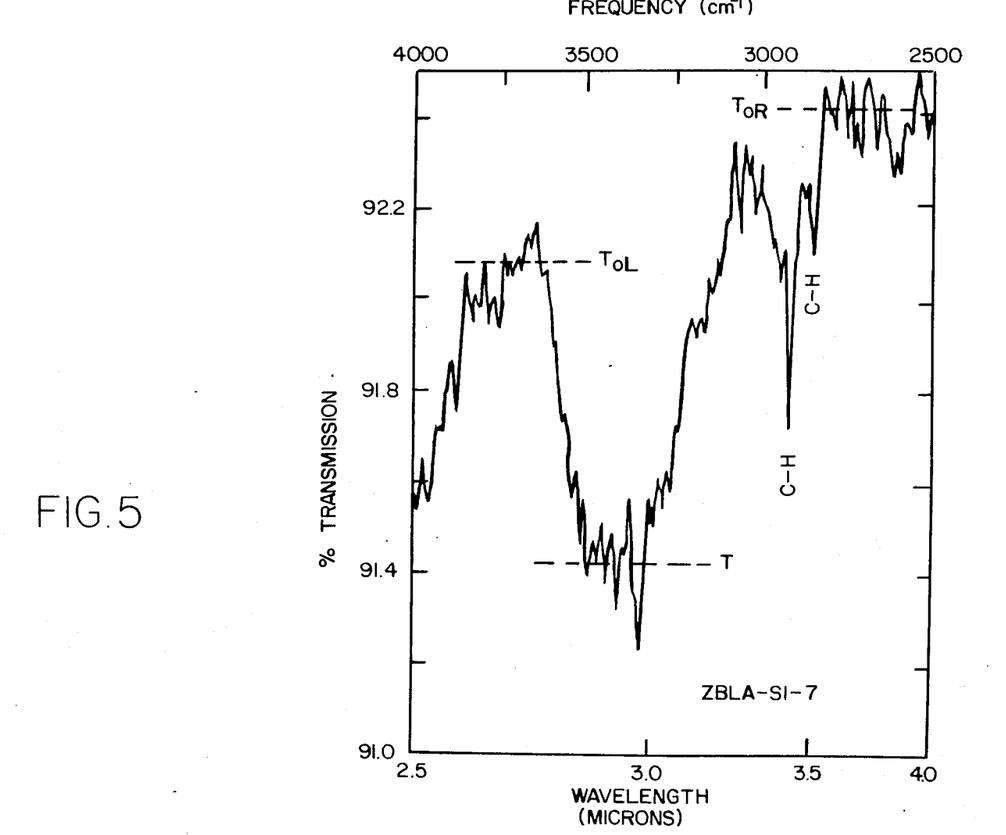
FIG. 5 is a graph of percent transmission versus wavelength.

As a further demonstration of the superior optical quality of heavy-metal fluoride glass specimens made in this invention, a transmission curve for specimen ZBLA-SI-7 is shown in FIG. 4. In addition to its wide range in transparency from the near-UV to the mid-IR (from 0.3 to about 5.5 microns), this specimen, in contrast to heavy-metal flouride glasses made by conventional melting-and-casting techniques, shows no absorption band at 2.9 microns (3400 $cm^{-1}$), nor does it display a 'shoulder' on its infrared edge. Nonvisibility of a He-Ne laser beam propagated through this specimen further attests to its superior optical quality, total homogeneity and absence of scattering sites.

FIG. 4 illustrates a typical percent transmission versus wavelength curve obtained for such a glass in the 1-8 micron region. In contrast to the strong OH fundamental stretching band often observed near 3400 $cm^{-1}$ in conventionally prepared samples, the SI series of glasses generally exhibited little or no absorption in this region. This suggests that the combination of materials purification, careful handling, and rigid control of melting environment, coupled with the use of $CCl_4$ reactive atmosphere has been successful in preventing OH contamination of the vitreous material. A feature not encountered previously is the very sharp absorption band centered on 2350 $cm^{-1}$. This band, which appeared only in the induction-furnace prepared specimens, is caused by carbon dioxide in the bulk of the glass. Its intensity was observed to be thickness dependent and there is evidence that it reaches an equilibrium saturation rapidly.

To assess the overall efficacy of the induction furnace method for preparing large HMFG specimens with very little bulk OH content, the OH band intensities of the SI sample series were determined as a function of sample thickness. Such an experiment yields a first order approximation of the contributions due to the bulk OH absorption and that adsorbed on the sample surface. To make this distinction, the 4000 to 2500 $cm^{-1}$ spectral region was examined at an expanded scale ($\times 66.6$) on the spectrometer as exemplified by the data for sample SI-7 in FIG. 5. The magnitude of the OH absorption on the expanded scale is represented by $(T_o - T)$, where $T_o$ is the measured transmission in a flat region of the spectrum where apparent losses are due only to reflection, and T is the measured transmission at the 3400 $cm^{-1}$ peak. Since there is a significant difference between the left and right hand "shoulders" of the 3400 $cm^{-1}$ peak, separate calculations were made using measurements of $T_o$ designated in FIG. 5 as "$T_{oL}$" and "$T_{oR}$". Gboji et al, J. Am. Ceram. Soc. 64 051(81), have noted that the dependence of the band intensity on sample thickness, x, should be given to a good approximation by $$\ln(T_o/T) = \alpha\, \text{bulk}^x + B \qquad (2)$$

Figure 6:
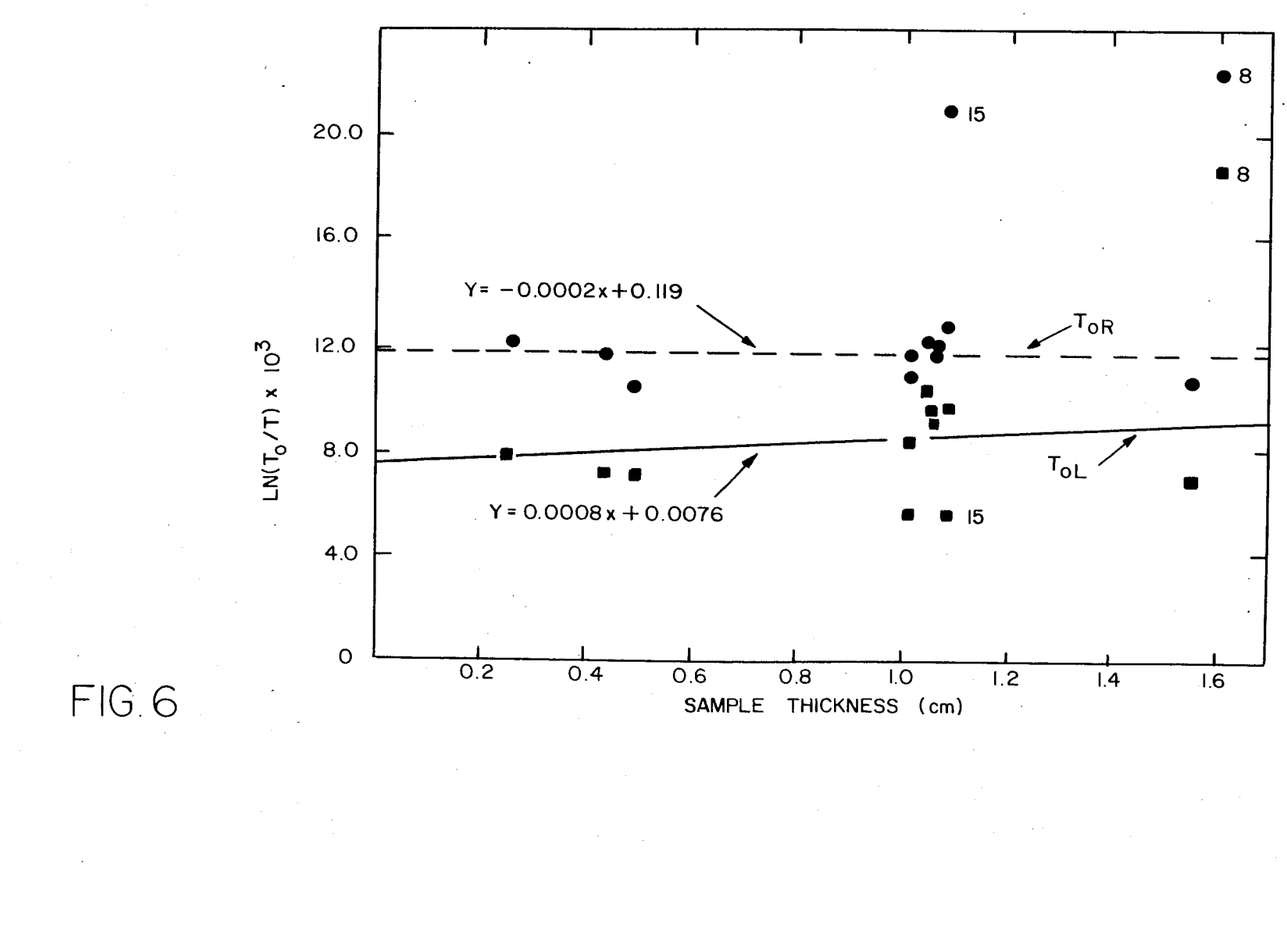
FIG. 6 is a graph of absorption peak intensity versus thickness.

When $\ln(T_o/T)$ is plotted as a function of sample thickness, the slope of a straight line fitted to the data gives an indication of the absorption coefficient due to bulk OH, while the y-intercept B is a measure of the contribution due to surface adsorbed OH. FIG. 6 shows such a plot for 10 samples from the SI series; the dashed line shows a least squares fit to the data (solid dots) obtained using the long wavelength side ($T_{oL}$). For reasons discussed below, specimens SI-8 and SI-15 were excluded from the curve fitting procedure. Both curves exhibit a slope close to zero suggesting that the specimens have a low bulk OH content. In the study of Gboji et al, individual specimens were repeatedly thinned prior to measurement; whereas in this work, as prepared samples spanning a broad range of thickness (0.2-1.6 cm) were measured separately. Given the experimental uncertainties, the parameters derived from the least squares fit suggest an absorption coefficient due to the bulk OH of less than 0.0008 cm$^{-1}$; this contrasts with the value of 0.01 cm$^{-1}$ or less suggested by Gboji et al, whose spectrometer only allowed a 5x expansion of the 3400 cm$^{-1}$ region. The y-intercepts of the curves in FIG. 6 indicate a contribution due to surface adsorbed OH of 0.0076 to 0.119 cm$^{-1}$; this compares favorably with the value of about 0.01 cm$^{-1}$ derived in the earlier study. The data of FIG. 6 indicates that 10 of the 12 ZBLA samples prepared by the induction-furnace method exhibited very low and reproducible bulk OH levels; the two HBLA samples fabricated in the course of this study also showed very minimal OH absorption in their mid-IR spectra. Only samples SI-8 and SI-15 appeared to contain large amounts of bulk OH (see FIG. 6). The powdered raw material for glass SI-8 was extensively handled outside the glove box in attempting to test the utility of a hydraulic pellet press for batch preparation. Significant water uptake may have occurred during this exposure to ambient atmosphere. Sample SI-15, which also exhibited anomalous UV and IR edge absorption (see below), was the only glass in the SI series prepared with an inferior grade of BaF$_2$. It is probable that hydroxyl contamination of this specimen may account for its comparatively high bulk OH content.

A crucial test of any method used to prepare heavy metal fluoride glasses is the ability to closely reproduce IR edge absorption coefficients from melt to melt. In previous studies utilizing samples prepared by oxide-conversion techniques, IR edge data has exhibited considerable scatter.

Figure 7:
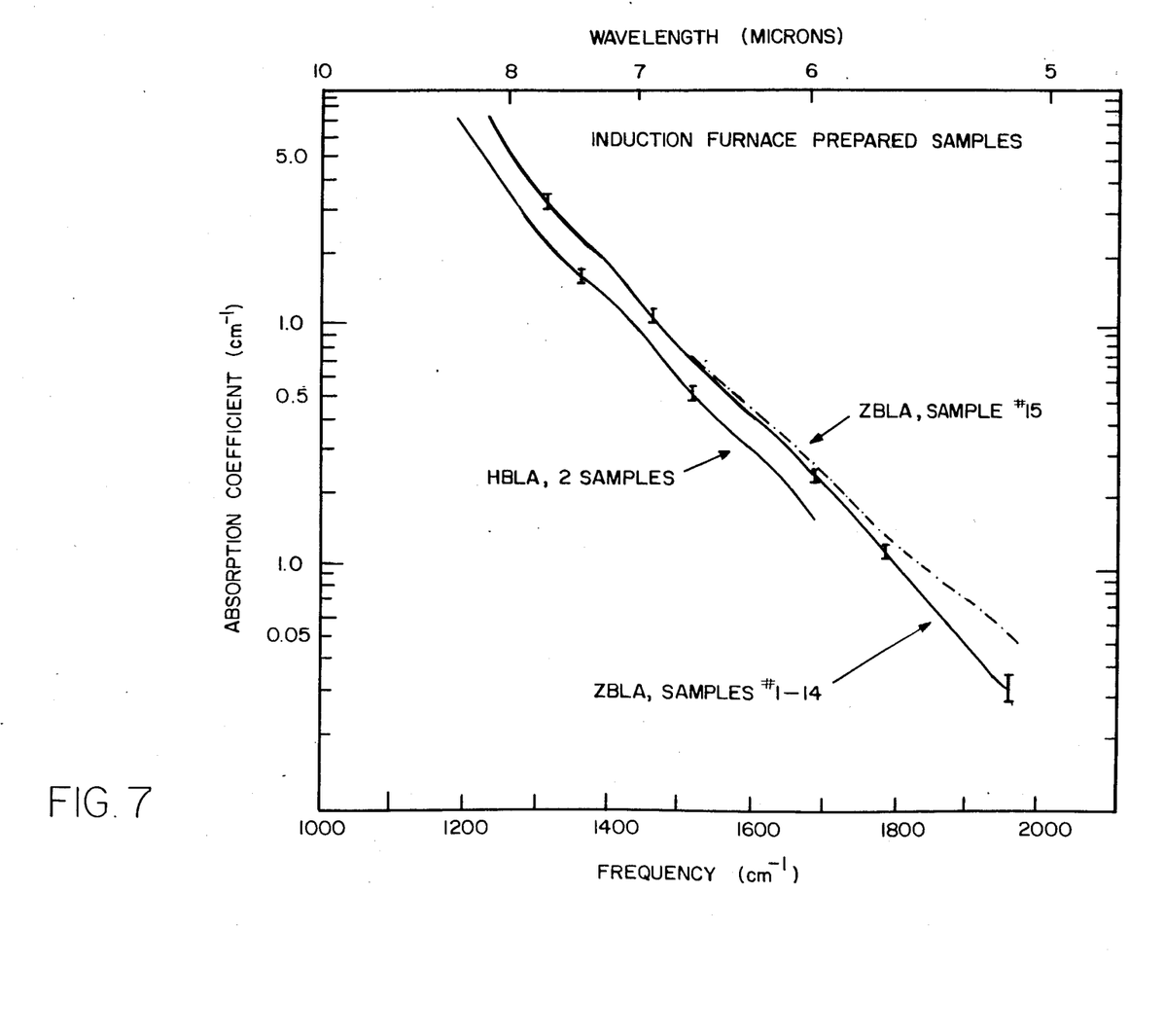
FIG. 7 is a graph of absorption coefficient versus frequency of various samples of HMFG made by the process of the present invention.
Figure 8:
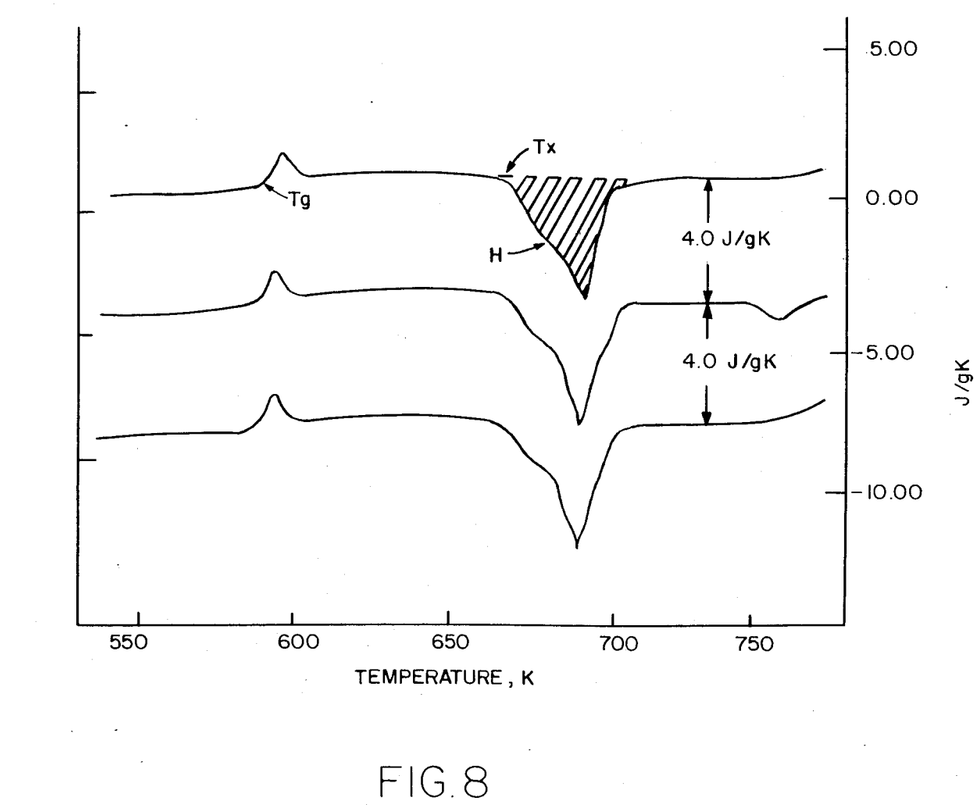
FIG. 8 is a graph of specific heat versus temperature.

FIG. 7 displays the absorption coefficients for the SI series of samples in the 2000-1100 cm$^{-1}$ region as derived from transmission curves such as FIG. 4. The error bars indicate the actual scatter of the data derived from the 11 ZBLA samples and 2 HBLA glasses. At frequencies of 1650 cm$^{-1}$ and 1950 cm$^{-1}$, this scatter in absorption coefficient amounts to 0.01 cm$^{-1}$ and 0.005 cm$^{-1}$ respectively. To emphasize the significance of this, the experimental uncertainty due to sample thickness and spectrometer accuracy at these frequencies is estimated to be about twice these values. Only the glass prepared using the lesser grade of BaF$_2$ exhibits significant deviation from the virtually superimposed curves representing samples 1 to 14. The ability of the induction furnace approach to consistently reproduce IR edge behavior is particularly noteworthy in view of the fact that the specimens shown in FIG. 7 were fabricated over a 6 month period, in most cases from individually-compounded batches of raw materials.

Through the use of a modified RF induction-heated crystal growth furnace, in conjunction with purified raw materials, careful attention to glass batch preparation and handling, and design of an effective heating and cooling regimen, it is possible to reproducibly fabricate relatively large pieces of fluorozirconate and fluorohafnate glasses. Glass ingots of 3.5 cm diameter and thicknesses of up to 2.0 cm with excellent optical homogeneity were formed in situ using this approach. Examination of optical and physical properties indicated that the specimens exhibited uniform and reproducible thermal parameters, UV and IR absorption edges, hardness, and a low bulk OH content. At a wavelength of 0.488 microns, the light scattering in samples prepared by the method was considerably less than that observed in fused silica.

Clearly, many modifications and variations of the present invention are possible in light of the above teachings and it is therefore understood, that within the inventive scope of the inventive concept, the invention may be practiced otherwise than specifically claimed.

What is claimed is:

1. A process of manufacturing a bulk heavy metal fluoride glass, said process comprising the steps of:
   obtaining constituent fluoride compounds of said heavy metal fluoride glass in as pure a form as possible;
   selectively refining said compounds by sublimation to obtain higher purity compounds;
   minimizing contamination of said compounds by the ambient atmosphere;
   weighing each of said compounds to obtain a desired composition of said heavy metal fluoride glass;
   mixing said compounds together to form said desired composition;
   forming a charge of said composition;
   loading a crucible with said charge;
   placing said crucible in a crystal growth furnace;
   sealing said furnace;
   evacuating said furnace;
   backfilling said furnace with an inert gas;
   creating a reactive atmosphere in said furnace to remove undesirable chemical groups from said charge;
   heating said charge to a charge fusion temperature to cause said charge to melt;
   allowing said charge to react with said reactive atmosphere;
   raising a temperature of said charge above said fusion temperature to insure admixture of molten constituent compounds of said charge;
   raising said charge to a higher temperature above an admixture temperature for a period of time, said charge reaching said higher temperature in about 1 to 2 hours from the start of said heating;
   lowering a temperature of said charge in a short period of time to a temperature less than said fusion temperature, said charge forming a bulk glass, in situ;
   removing said crucible from said furnace; and
   removing said bulk glass.

2. A process as defined in claim 1 wherein said step of lowering a temperature occurs as a result of turning off heating power, rapidly cooling to a vitreous condition said charge, and removing said crucible from sources of heat therein.

3. A process as defined in claim 1 wherein said lowering of temperature of said charge occurs at a maximum rate of about 90° C. per minute.

4. A process as defined in claim 3 wherein said lowering a temperature of said charge occurs at a rate of about 50° to 90° C. per minute through a critical crystallization region, said critical region being about 500° to 600° C.

5. A process as defined in claim 1 wherein said forming of a bulk glass occurs within one hour.

* * * * *